United States Patent
Bryan et al.

[11] Patent Number: 6,067,752
[45] Date of Patent: May 30, 2000

[54] PLANT ROOTS AND BULB PROTECTION SYSTEM

[76] Inventors: Dorothy A. Bryan; Percy W. Bryan, Jr., both of 35 Porreca Dr., Millville, N.J. 08332

[21] Appl. No.: 09/303,620

[22] Filed: Apr. 10, 1999

Related U.S. Application Data

[63] Continuation-in-part of application No. 09/012,625, Jan. 23, 1998, abandoned.

[51] Int. Cl.[7] .......................... A01G 23/02; A01G 23/04; A01G 9/02; A01G 25/00; A01G 17/06
[52] U.S. Cl. .......................... 47/73; 47/76; 47/78; 47/47; 47/79
[58] Field of Search ................................. 47/73, 76, 75, 47/78, 79, 82, 485, 44, 45, 46, 47, 59, 27, 26, 29, 30, 31; 206/805; 220/493; 52/165

[56] References Cited

U.S. PATENT DOCUMENTS

| | | |
|---|---|---|
| 879,613 | 2/1908 | Edwards ................................ 47/78 |
| 951,807 | 3/1910 | Erdly .................................... 47/47 |
| 1,464,801 | 8/1923 | Beers .................................. 220/493 |
| 1,689,017 | 10/1928 | Fewkes ................................ 47/78 |
| 1,976,264 | 10/1934 | Miner et al. ........................ 52/165 |
| 2,252,073 | 9/1941 | Gray .................................... 47/78 |
| 3,238,671 | 3/1966 | Binyon ................................. 47/70 |
| 3,415,012 | 12/1968 | Stubbman ............................. 47/78 |
| 3,875,699 | 4/1975 | Lamarre ............................... 47/46 |
| 4,062,148 | 12/1977 | Edmonds, Jr. et al. .............. 47/78 |
| 4,142,324 | 3/1979 | Magyar, Jr. .......................... 47/75 |
| 4,250,664 | 2/1981 | Remke ................................ 47/76 |
| 4,403,447 | 9/1983 | Braun .................................. 47/76 |
| 4,604,825 | 8/1986 | Mainprice ........................... 47/76 |
| 4,706,411 | 11/1987 | Lövqvist .............................. 47/30 |
| 4,716,680 | 1/1988 | Whitcomb et al. .................. 47/73 |
| 4,796,383 | 1/1989 | Inoue et al. ......................... 47/73 |
| 4,829,707 | 5/1989 | Koffler et al. ..................... 47/28.1 |
| 5,025,590 | 6/1991 | Smith .................................. 47/76 |
| 5,090,155 | 2/1992 | Rodgers .............................. 47/30 |
| 5,279,073 | 1/1994 | Czebeiniak ........................ 47/48.5 |
| 5,327,678 | 7/1994 | Schweiker ........................... 47/70 |
| 5,341,593 | 8/1994 | Foreman ............................. 47/47 |

(List continued on next page.)

FOREIGN PATENT DOCUMENTS

| | | | |
|---|---|---|---|
| 122561 | 5/1900 | Germany | 47/76 WB |
| 145483 | 8/1902 | Germany | 47/76 WB |
| 2951655 | 7/1981 | Germany | 47/76 WB |
| 299 | 1/1885 | United Kingdom | 47/73 R |

OTHER PUBLICATIONS

"Moles in the Vegetable Garden", Rutgers Cooperative Extension, New Jersey Agricultural Experiment Station, Mar. 1997.
"Couple Invents Bulb Cage to Protect Flowers", The Press of Atlantic City, Joyce Vanaman, Oct. 1997.
"Root Guard, Gopher wire basket", advertisement for Digger's of Sequel, CA, Jan. 1987.
"The Flair from Floralware" advertisement for a plant container by Floralware, Sep. 1979.

*Primary Examiner*—Michael J. Carone
*Assistant Examiner*—Fredrick T. French, III

[57] ABSTRACT

A bulb and root protection system for allowing bulbs and rooted plants to be planted in the ground and protected from small burrowing animals. A protection cage has a top edge, and encloses a volume. The protection cage is open at the top edge. The protection cage is placed in the soil up to the top edge wherein bulbs or rooted plants are placed inside an interior volume of the protection cage, and the protection cage is filled with soil. Small animals are prevented from reaching the bulb or planted roots by the protection cage, but roots growing from the bulb or plants can grow and penetrate the mesh of the protection cage. The bulb and plant root protection system is additionally provided with a flexible liner provided within the interior volume. A dual purpose stabilizing strut is also provided with the plant root and bulb protection system, the strut comprising an anchor portion and a water dispensing portion for dispensing water below the surface of the ground to the plants roots or the bulb.

8 Claims, 2 Drawing Sheets

U.S. PATENT DOCUMENTS

| | | | |
|---|---|---|---|
| 5,471,788 | 12/1995 | Willes | 47/75 |
| 5,495,692 | 3/1996 | Lojacono, Jr. | 47/78 |
| 5,522,178 | 6/1996 | Cone | 47/58 |
| 5,523,331 | 6/1996 | Ezoe | 524/25 |
| 5,544,447 | 8/1996 | Easey et al. | 47/66 |
| 5,605,010 | 2/1997 | Furlong et al. | 47/48.5 |

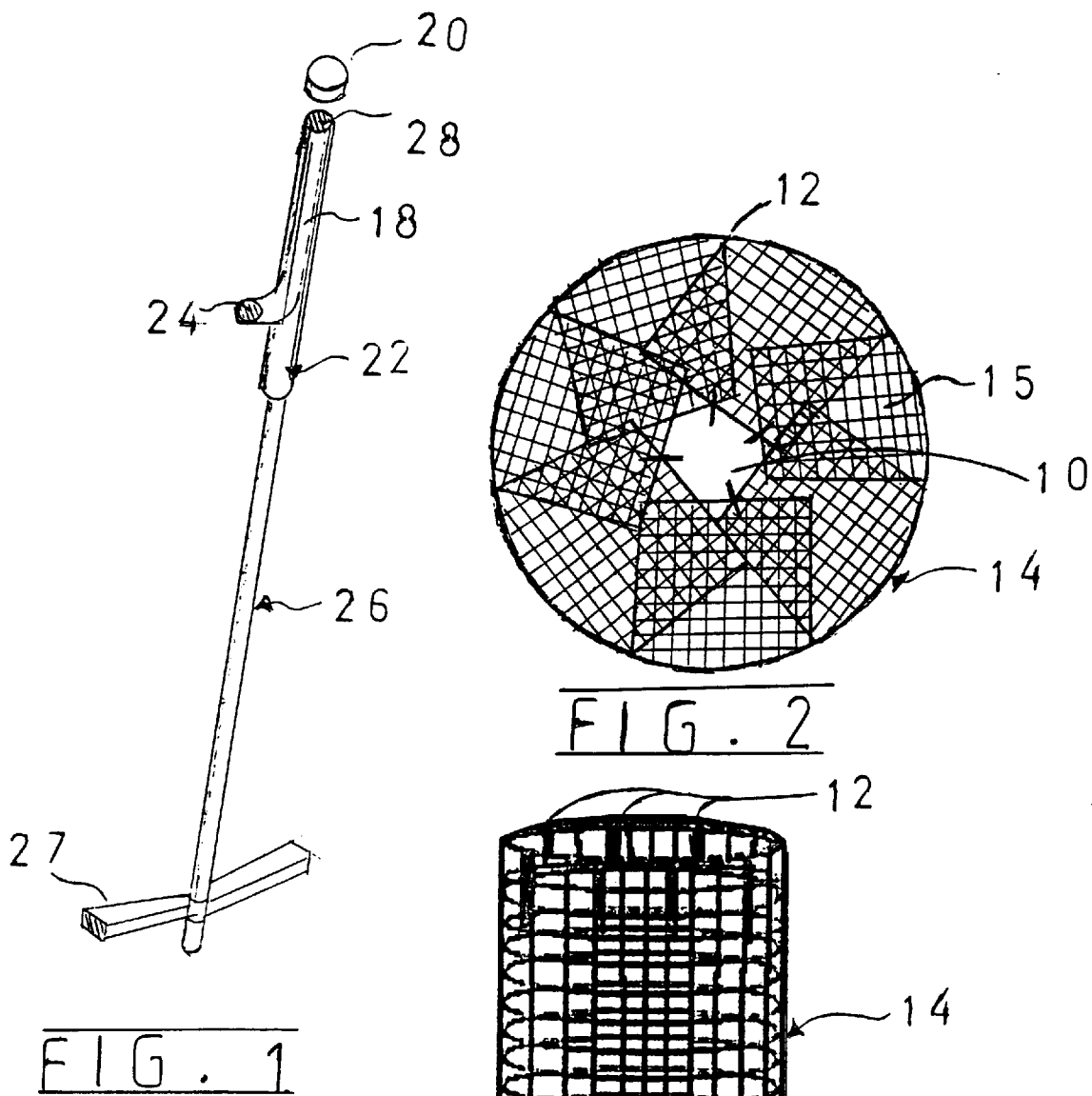
FIG. 1
FIG. 2
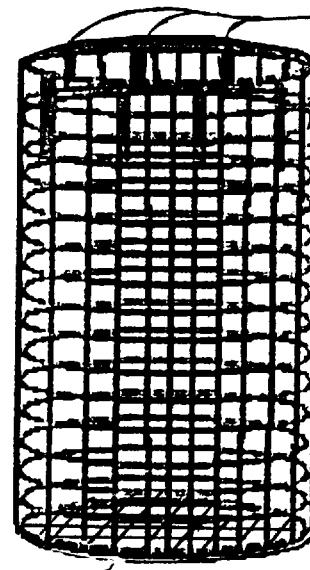
FIG. 3

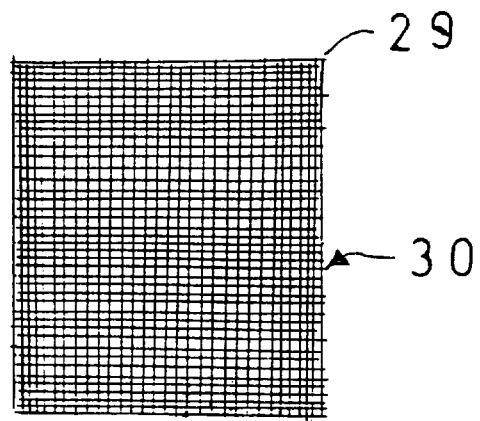
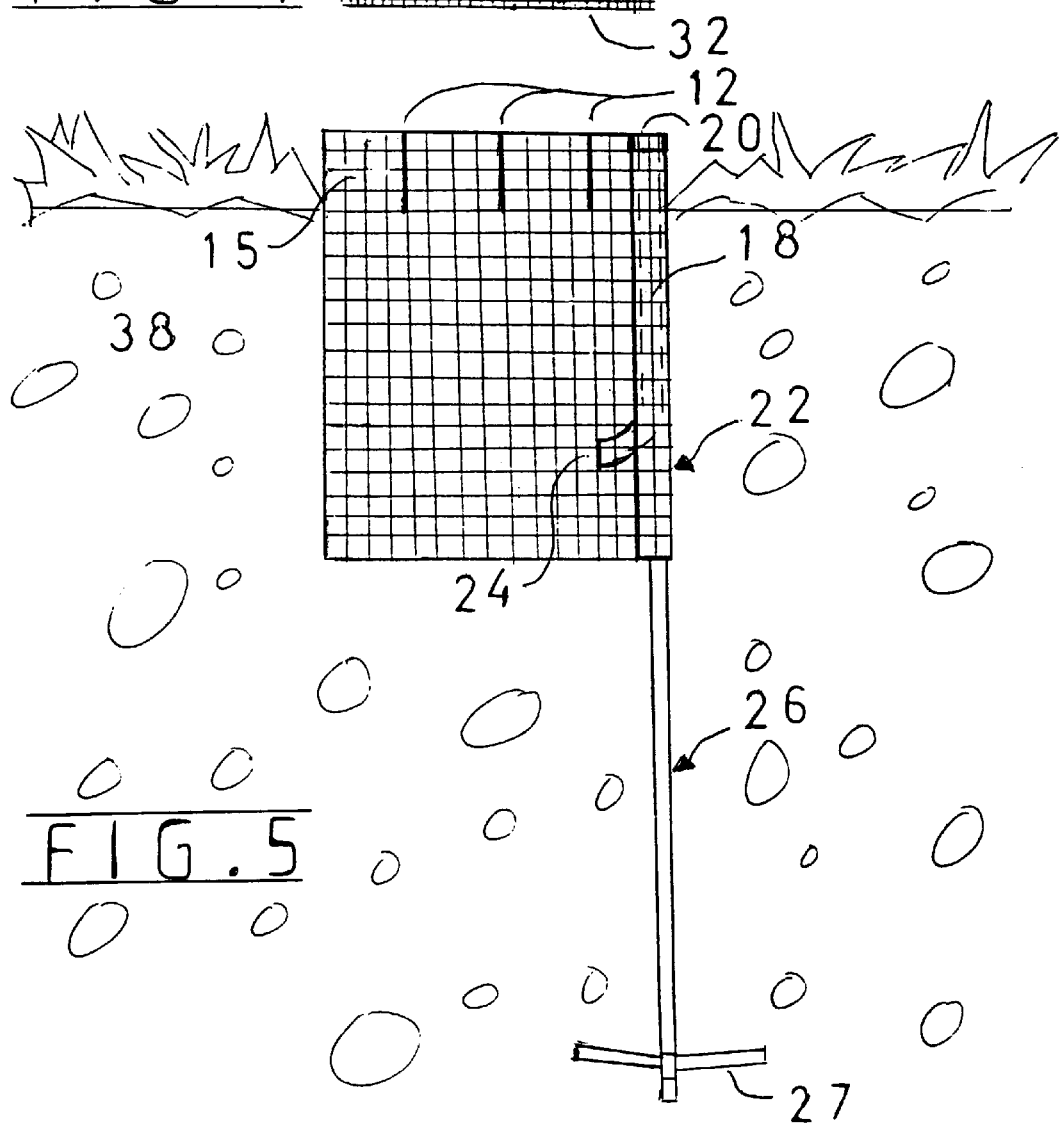

PLANT ROOTS AND BULB PROTECTION SYSTEM

CROSS REFERENCE TO RELATED PATENT APPLICATIONS

This application is a Continuation in Part of U.S. patent application Ser. No. 09/012,625 filed on Jan. 23, 1998, now abandoned.

BACKGROUND OF THE INVENTION

The invention relates to a plant roots and bulb protection system. More particularly, the invention relates to a system which protects bulbs once they are in the ground, to prevent bulb and root damage by animals that burrow with the ground.

People have great pride in their plants and gardens. Although the labor of planting and maintaining a garden can be its own reward, the pleasure is in watching the vegetation flourish, and admiring the beauty created through one's labor. However, when plants are harmed, it can be quite disheartening.

Ground burrowing animals, such as moles or ground squirrels can cause serious damage to plants. These animals dig under ground passageways which can bring them into contact with roots and bulbs from a developing plant. Plants arc quite vulnerable to attack, and are quite commonly destroyed in such a manner.

U.S. Pat. No. 4,706,411, to Lovqist, discloses a plant guard which protects a plant from insect attack. The plant guard surrounds the plant at its lowest above ground point to prevent insects from reaching vegetation at the upper levels of the plant.

U.S. Pat. No. 4,829,707 to Koffler et al, discloses a plant protector. The device as taught by Koffler protects plants from the elements, and from insects, birds, and small animals, by surrounding the plant with an above ground protective shield.

While these devices may be suitable for the particular purpose employed, or for general use, they would not be as suitable for the purposes of the present invention, as disclosed hereafter.

SUMMARY OF THE INVENTION

The plant protection device of the instant application has features which were disclosed in previously filed U.S. patent application Ser. No. 09/012,625, filed on Jan. 23, 1998, being abandoned on Sep. 22, 1999, the entirety of which is incorporated by reference herein.

It is a principal object of the present invention to provide an improved, superior device that completely encloses and protects bulbs and rooted plants, shrubs, etc. from the ravages of burrowing underground animals.

It is a further objective of the present invention to provide a protection liner for plants against attack from, particularly, grubs, small insects, yet water can freely flow through vegetables, flowers, bulbs, shrubs, and plant roots.

It is a still further objective of the present invention to provide a protection liner that will satisfy a present unsolved need and correct the failure of others.

It is yet a further objective of the present invention is to provide a device where roots can grow without having to be directed in or outside of the container.

It is yet another objective of the present invention to provide a permanent device, in the ground, against burrowing animals and insects.

It is still a further object of the present invention to provide a container that is fixed securely in the ground.

It is yet another object of the present invention to provide an easy-to-assemble device that is economical to manufacture, and economical to purchase.

There are several advantages which arise from using the bulb and plant root protection system of the present invention. Some of the advantages include, 1) a protection device so as not to take bulbs and plants in and out of the ground for storage, 2) the bulbs are protected in the ground year-round, 3) to provide an almost maintenance free protection device to the consumer, 4) to save time in the garden with no yearly hole digging, and less physical labor, 5) to provide a protection for the animals so that no harm will be done to them, 6) to provide a protection device that is environmentally safe with no toxic chemicals to harm humans or creatures, 7) to cut cost to the consumer in as much as they wouldn't lose their bulbs year after year to ground burrowing animals.

By the present invention, an improved plant, root, and bulb protection system, accordingly, there is a need for a device that is durable and stable for the protection of rooted plants and bulbs from the ravages of burrowing underground and above the ground animals. The liner will prevent grubs and insects from entering the root and bulb system. The stabilizing strut which prevents the device from being dismounted from the ground by burrowing animals also incorporates a tube to provide helpful fluids to benefit the bulbs and roots.

BRIEF DESCRIPTION OF THE DRAWINGS

In the drawings, like elements are depicted by like reference numerals. The drawings are briefly described as follows.

FIG. 1 is a partially exploded view of a stabilizing strut with an anchor and inserted tube for fluids.

FIG. 2 is a top view of a plant protection device with finned top designed to enclose around stem of plant equiped with clamps to hold securely in place.

FIG. 3 is a partially exploded view of plant root or bulb protection device with enclosed bottom and finned top, designed to enclose at top around plant stem.

FIG. 4 is a side view of a liner to be coupled inside protection device.

FIG. 5 is a side view of a root and bulb protection device in ground with stabilizing strut and fluid tube also positioned in ground.

DESCRIPTION OF PREFERRED EMBODIMENTS

The root and bulb protection device is designed to protect against attacts from burrowing animals that destroy or seriously damage root system from sides, bottom or top while planted in ground. The protective system also is designed to protect against invading larvae into root system by providing a flexible liner to be coupled within a rigid cage device thus sufficiently reducing the normal distraction of roots or bulbs due to the fact that moles would not be as likely to be attracted to plant root area to feed on larvae.

A stabilizing strut is provided to give needed protection, not provided by other root and bulb protection systems, against aggressive burrowing animals that possess the ability to dismount cage device from ground thus distroying or seriously damaging plants.

To further benefit plants and give added usefullness to stabilizing strut a fluid tube is inserted and directed to root system to provide a safe protective and helpful fluid source to roots or bulbs.

Referring now to the drawings and particularly to FIGS. 1–5 a plant root and bulb protection system of the present invention is illustrated by 14 rigid cage device made of galvanized metal, plastic or glass equiped with a stabilizing strut 26 a fluid tube 18 and a flexible coupling liner 30.

The rigid cage device 14 has an enclosed bottom 36 with a finned top 15 that is slitted 12 designed to enclose around stem of plant at ground level by bending fins 15 in place around plant stem. Once in place around plant stem fins 15 are secured by clamps 10 thus locked in position. The rigid cage device can be made of one piece meshed material, easy to construct and inexpensive to manufature, or can consist of multiple pieces to be placed in ground 38.

The flexible coupling liner 30 is designed to be inserted into rigid cage device 14 and can be made into what ever size the rigid cage device 14 should be which can vary in size and shape. The flexible coupling liner 30 can be made of PVC coated fiberglass or any flexible material designed not to decompose in ground 38. It has a top 29 that can enclose around stem of plant and a completely closed bottom 32. Roots can penetrate material due to its cloth like nature and thus be allowed to grow and extend out of liner.

The stabilizing strut 26 is equiped with a butterfly anchor 27 that has a spring action that allows it to be inserted in ground 38 with minimal resistance but would require much more effort to remove. The stabilizing strut 26 can be made of galvanized metal, plastic or any rigid material that would not corrode in ground 38.

Within the stabilizing strut 26 a fluid tube 18 is inserted made of plastic or any material non corrosive in ground. It would be equiped with a cap 20 and fluid can be injected in by means of a pressurized dispenser, etc. through top opening 28 and flowing through fluid tube 18 and out of spout 24. The stabilizing strut 26 is made with a larger diameter top portion 22 that encases fluid tube 18 and secures protective cage device 14 firmly in ground.

Thus the present invention provides an improved root and bulb protection system that is environmentally safe and is not designed to harm animals or creatures in their natural environment.

It also affords protection by clamping top of protection cage device whereby squirrels or other animals that can dig from top and subsequently cause root systems to be exsposed will be suffuciently discouraged from doing so.

The present invention thus described provides a safe solution to a long time and present problem for many that would like to grow plants of all sorts but are unable to do so because of the damage inflicted by ground burrowing animals.

While the preferred embodiment of the invention has been shown and described, it will be apparent to those skilled in this art that various modifications may be made without departing from the spirit of the present invention. Therefore, all suitable modifications and equivalents fall within the scope of the invention.

What we claim in our invention is:

1. A plant root and bulb protection system adapted to be buried in the ground for protecting bulbs and plant roots planted in the protection system from ground burrowing pests, the protection system comprising;

a protective cage formed of a rigid mesh configuration, having an interior volume enclosed by at least one side wall having a depth, an at least partially open top and an enclosed bottom, said at least one side wall having a plurality of slits partially extending along said depth toward said enclosed bottom forming a plurality of discrete fins around a periphery of the top edge of the protective cage;

a stabilizing strut attached to the at least one side wall of said protective cage to stabilize the protective cage in the ground, said stabilizing strut having an upper portion having a length and a lower portion, the upper portion and the lower portion joined at an intermediate point along said stabilizing strut, the lower portion of the strut being a solid rod having at least one projection pivotally attached to the rod and extending away from the lower portion of the strut to anchor the protection system in the ground, the lower portion of the strut being adapted to prevent removal from the ground of the protection system, the upper portion comprising a hollow tube being open at an upper end and having a spout intermediate along the length of said upper portion for irrigating the interior volume of said protective cage, said upper portion having a removable cap to close the hollow tube; and wherein in use, the protective cage and attached stabilizing strut being buried in the ground with said fins extending above a surface of said ground and the upper portion of said stabilizing strut extending at least partially above said surface of said ground permitting ingress of water, the lower potion of the stabilizing strut extending substantially into the ground below the enclosed bottom of said protective cage thus stabilizing and supporting said protective cage, said fins being folded toward a center of the protective cage along the surface of the ground forming a folded cover for said protection system lieing in a plane formed by the surface of the ground, each fin overlapping horizontally and being secured with a clamp to each adjacent fin leaving a centrally formed opening for a plant stalk to extend above the surface of the ground.

2. The plant root and bulb protection system according to claim 1, wherein the at least one projection of the lower portion of the stabilizing strut is a spring action anchor which collapses peripherally along the lower portion of the stabilizing strut during insertion into the ground and springs outwardly engaging surrounding subterranean ground.

3. The plant root and bulb protection system according to claim 2, wherein the at least one projection of the lower portion of the stabilizing strut is a spring action anchor and the at least one projection comprises two oppositely directed projections.

4. The plant root and bulb protection system according to claim 1, wherein the protection system further comprises a flexible coupling liner insertable into and conforming to the interior volume of the protective cage for protecting bulbs and plant roots from ground burrowing insects while allowing said plant roots to penetrate to an exterior of said protective cage.

5. The plant root and bulb protection system according to claim 4, wherein the flexible coupling liner being formed of coated fiberglass.

6. The plant root and bulb protection system according to claim 4, wherein the flexible coupling liner being formed of a flexible material being non-biodegradable.

7. The plant root and bulb protection system according to claim 1, wherein the stabilizing strut being formed of a non-corrodible material.

8. The plant root and bulb protection system according to claim 1, wherein the irrigating of the interior volume of the protective cage being through pressure injection.

\* \* \* \* \*